Aug. 24, 1937.  L. C. SMALL  2,090,877
HYDRAULIC VALVE GEAR OPERATION FOR INTERNAL COMBUSTION ENGINES
Filed Nov. 27, 1935   7 Sheets-Sheet 1

Inventor.
Lester Charles Small

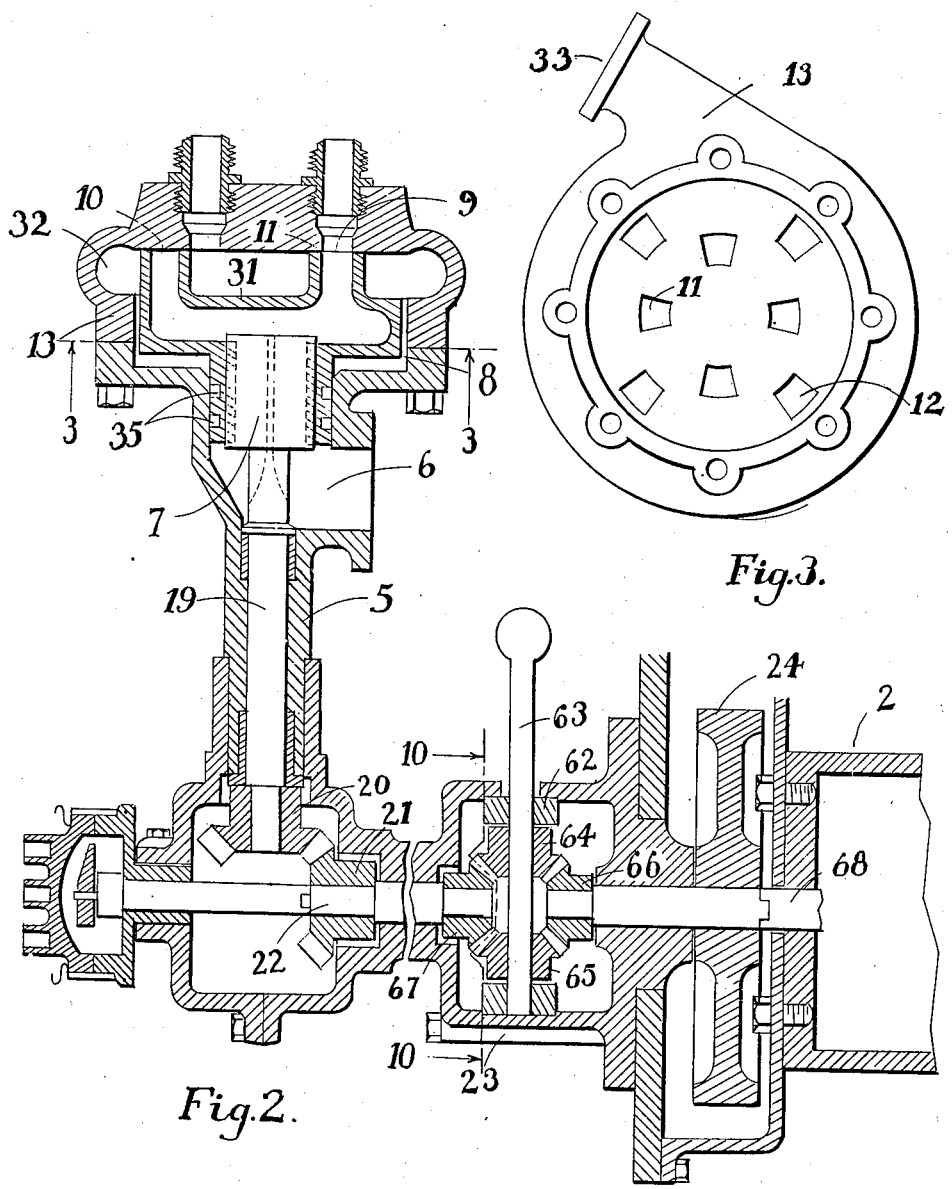

Aug. 24, 1937.  L. C. SMALL  2,090,877
HYDRAULIC VALVE GEAR OPERATION FOR INTERNAL COMBUSTION ENGINES
Filed Nov. 27, 1935  7 Sheets-Sheet 3
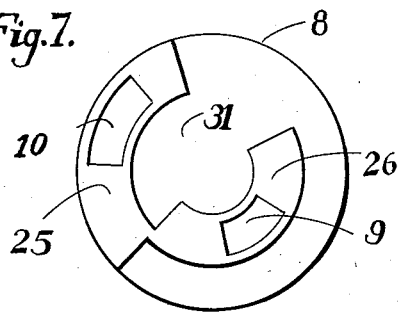
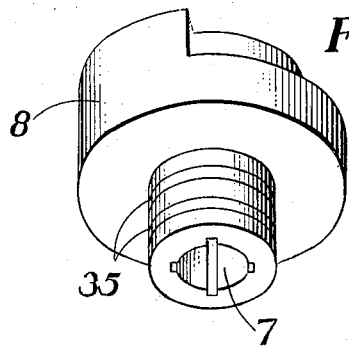
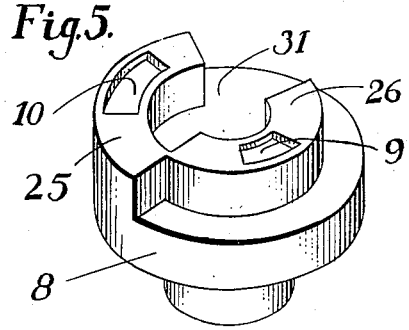
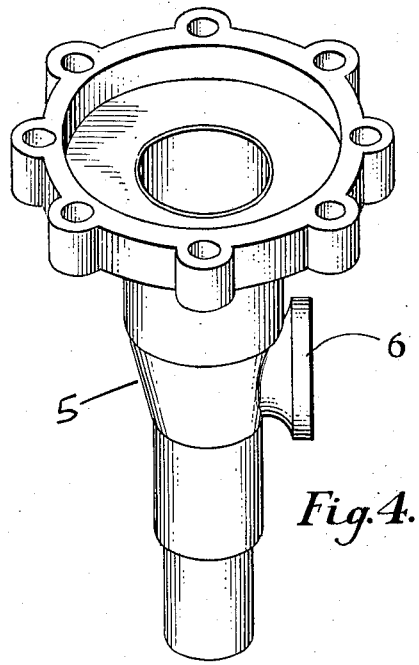
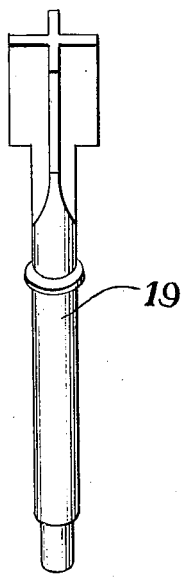
Inventor.
Lester Charles Small

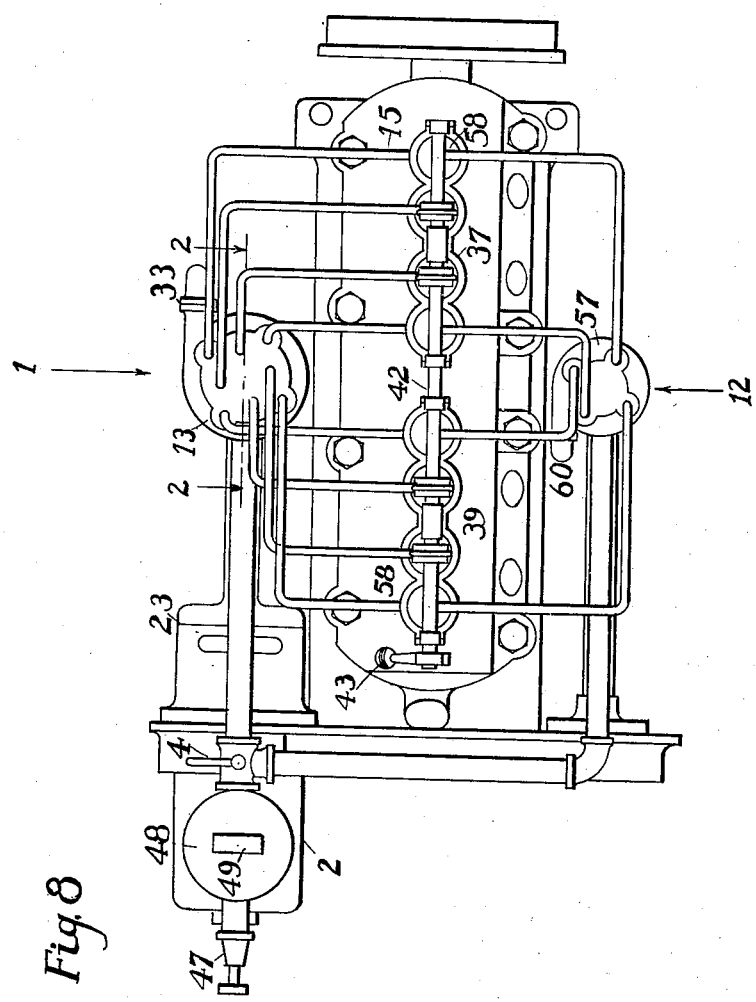

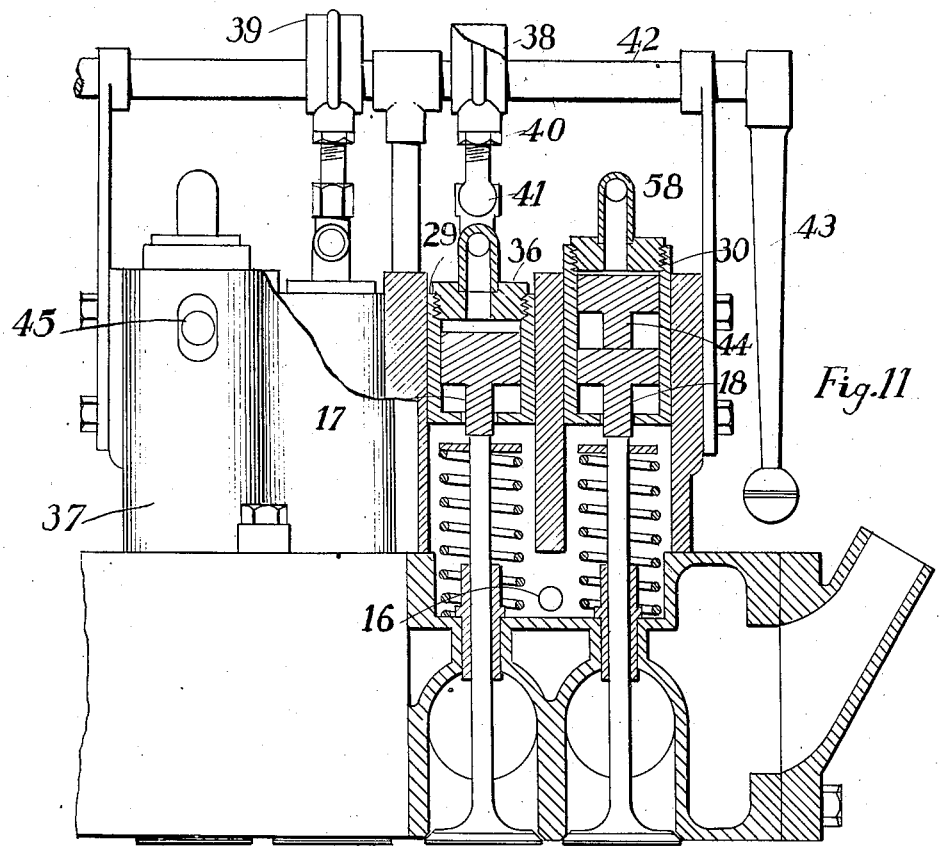
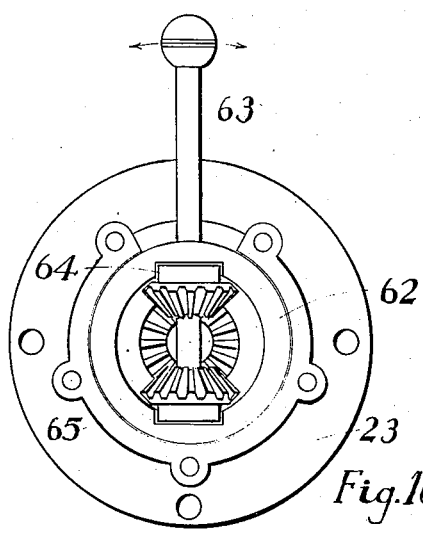
Fig.11
Fig.10

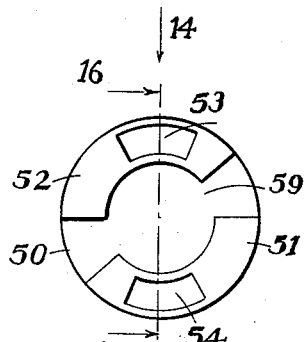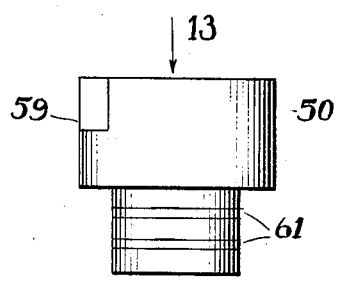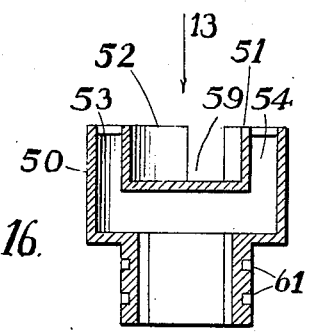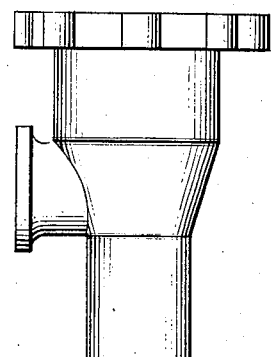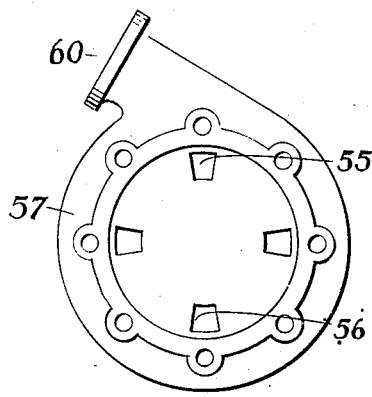

Patented Aug. 24, 1937

2,090,877

UNITED STATES PATENT OFFICE 2,090,877

HYDRAULIC VALVE GEAR OPERATION FOR INTERNAL COMBUSTION ENGINES

Lester Charles Small, Glendale, Calif.

Application November 27, 1935, Serial No. 51,838

32 Claims. (Cl. 123—90)

My invention has to do with internal combustion engines of the poppet valve type, in which the poppet valves are actuated to opening position by hydraulic operation, such valves being returned to their closed position by a spring, the action of the spring reversing the direction of flow of at least a portion of the hydraulic fluid.

In this type of valve control one part of my invention may be considered as relating to the control of the valves for the power drive, in which the intake and exhaust valves are operated on the four cycle principle.

Another feature of my invention comprises utilizing the cylinders and compression therein as a brake, for instance, when a vehicle or the like is rolling on a down grade and the rotating drive shaft actuates to operate the engine, in this case another or secondary feature of my invention relates to a hydraulic control of the valves, particularly the exhaust valves whereby on closing off the supply of fuel and the ignition, the engine may operate on a two-cycle principle as a pump, pumping air or exhaust gases through the engine, these acting on compression and thus retarding the operating of the engine. A further feature of my invention consists of utilizing either one or both of the above types of valve mechanism, in which they may be alternately brought into operation or the hydraulic control of the valves for power drive may be utilized independent of the valve control to use the engine as a brake, or if desired the engine may be equipped with my hydraulic connection to use the engine in functioning as a brake without or independent of the use of my feature of the hydraulic valve control for the power actuation of the engine.

An object and feature of my invention in regard to the hydraulic control of the valves in the power drive has as a main object and feature a type of hydraulic distributor for opening and closing hydraulic valves utilizing a rotary hydraulic valve action. In this construction the rotary hydraulic valves control the flow of hydraulic fluid to and from cylinders having pistons for actuating the poppet valves to their open positions. In this connection a function of the rotary valves is in the development of a centrifugal exhaust action whereby when the poppet valves are being closed by their springs the centrifugal flow developed reduces the back pressure on the hydraulic fluid during the return stroke of the pistons of the valve mechanism and thus allows a quick closing of the valves.

Another feature of my invention comprises varying the lift of the valve plugs, that is, varying the amount of opening of the poppet valves and providing mechanism by which this variation can be accomplished while the engine is under operation. A detailed feature of this part of my invention relates to bodily sliding the cylinders in which the pistons operate for actuating the poppet valves, there being a flexible hydraulic connection to such pistons. By this arrangement and construction in shifting the pistons, the amount of opening in the valves may be thus regulated, as the pistons may have a longer stroke to increase the volve opening.

Another important feature of my invention relates to varying the timing of the operation of the poppet valves, that is, to advance or retard the valve operation in its relation to the piston movement in the engine and the relative time of the ignition through the ignition system, thus by this construction and while the engine is in operation, the actuation of the hydraulic distributor having the hydraulic valves may be advanced or retarded in relation to the operation of the shaft and pistons of the engine to thereby change in advancing or retarding the relative time of the hydraulic operation of the poppet valves. This feature of my invention, of advancing or retarding the hydraulic distributor, is accomplished by using a differentiation in the mechanical drive to the rotary valve hydraulic distributor.

Another detailed feature of my invention in relation to the hydraulic distributor is in utilizing a pump to maintain a sufficient hydraulic head and maintain a proper seat of the rotary hydraulic valves due to the pressure of the fluid on the valve structure. This is accomplished by mounting the rotor of the hydraulic valves in a slidable manner in which the hydraulic fluid acts longitudinally of the rotor and maintains a proper seat so that the ports of the rotor which discharge in a line parallel to the axis of the rotor are maintained properly seated against the fixed seat of the distributor, which seat has the various ports for the intake and exhaust poppet valve control.

An object and feature of my invention in controlling the exhaust valves on a two cycle principle to cause the engine to act as a pump, involves having a separate hydraulic distributor with a rotary distributing type of valve and having connections from this valve to the exhaust poppet valves of the engine. Such exhaust valves are operated with a double piston; normally the single piston being utilized in the power strokes but the double piston is utilized when the engine operates as a pump on the two cycle principle. In this construction the two-way hydraulic valve from the main pump may be actuated to divert the hydraulic fluid from the main distributor of the power system to the system of the secondary distributor of the pump or brake system. In this case the intake valves of each cylinder remain closed and the exhaust poppet valves are actuated hydraulically to open at the beginning of the downward stroke of the piston to allow entrance of air from the exhaust manifold. The exhaust valve is held closed for a portion of the upstroke of the piston, thereby causing a compression which is released at a predetermined point of the upstroke of the engine piston.

My invention is illustrated in connection with the accompanying drawings, in which, Fig. 1 is a side elevation of an engine showing the main distributor and hydraulic connection for the power operation of the internal combustion features of the engine. This figure is taken in the direction of the arrow 1 of Fig. 8.

Fig. 2 is a vertical longitudinal section of part of the main hydraulic distributor as if taken substantially on the vertical section line 2—2 of Fig. 8 in the direction of the arrows, illustrating also in section a portion of the differential for advancing and retarding the relative positions of the hydraulic valves and the distributor.

Fig. 3 is a horizontal section on the line 3—3 of Fig. 2 in the direction of the arrows, showing the upper or fixed portion of the distributor head.

Fig. 4 is an isometric view of the distributor shaft housing and the lower portion of the distributor housing.

Fig. 5 is an isometric view of the rotor of the main distributor taken in the direction looking from the top downwardly, the rotor being removed from its housing.

Fig. 6 is an isometric view of the rotor of the main distributor, showing the distributor of Fig. 5 as if viewed from underneath.

Fig. 7 is a plan of the main distributor shown in perspective in Figs. 5 and 6.

Fig. 8 is a plan of the engine, showing the location of the hydraulic mechanism on both sides of the cylinder block. This figure may be considered as taken in the direction of the arrow 8 of Figs. 1 or 12.

Fig. 9 is an isometric view of the splined drive shaft for the rotor of the distributor.

Fig. 10 is a transverse section of part of the differential for varying the timing of the hydraulic distributor. This figure may be considered as taken substantially on the vertical section line 10—10 of Fig. 2 in the direction of the arrows.

Fig. 11 is an enlarged elevation partly broken away and partly on a section line, showing the right hand poppet valve control cylinders and pistons and their connections such as shown at the right hand end of Fig. 1.

Fig. 13 is a plan of the rotor of the secondary hydraulic distributor for controlling the exhaust valves when using the engine as a pump. Such figure may be considered as taken in the direction of the arrow 13 of Figs. 14 and 16.

Fig. 14 is an elevation of the rotor of the distributor of Fig. 13, taken in the direction of the arrow 14 of Fig. 13.

Fig. 15 is a transverse section on the line 15—15 of Fig. 12 of the stationary head of the secondary distributor, showing the fixed outlet ports therein.

Fig. 16 is a detail vertical section of the rotor of Figs. 13 and 14 as if taken in the direction of the section line 16—16 of Fig. 13.

Fig. 17 is an enlarged elevation of the distributor shaft housing and the housing for the rotor of the secondary hydraulic distributor used for controlling the exhaust valves when the engine operates as a pump in braking.

Figure 1:
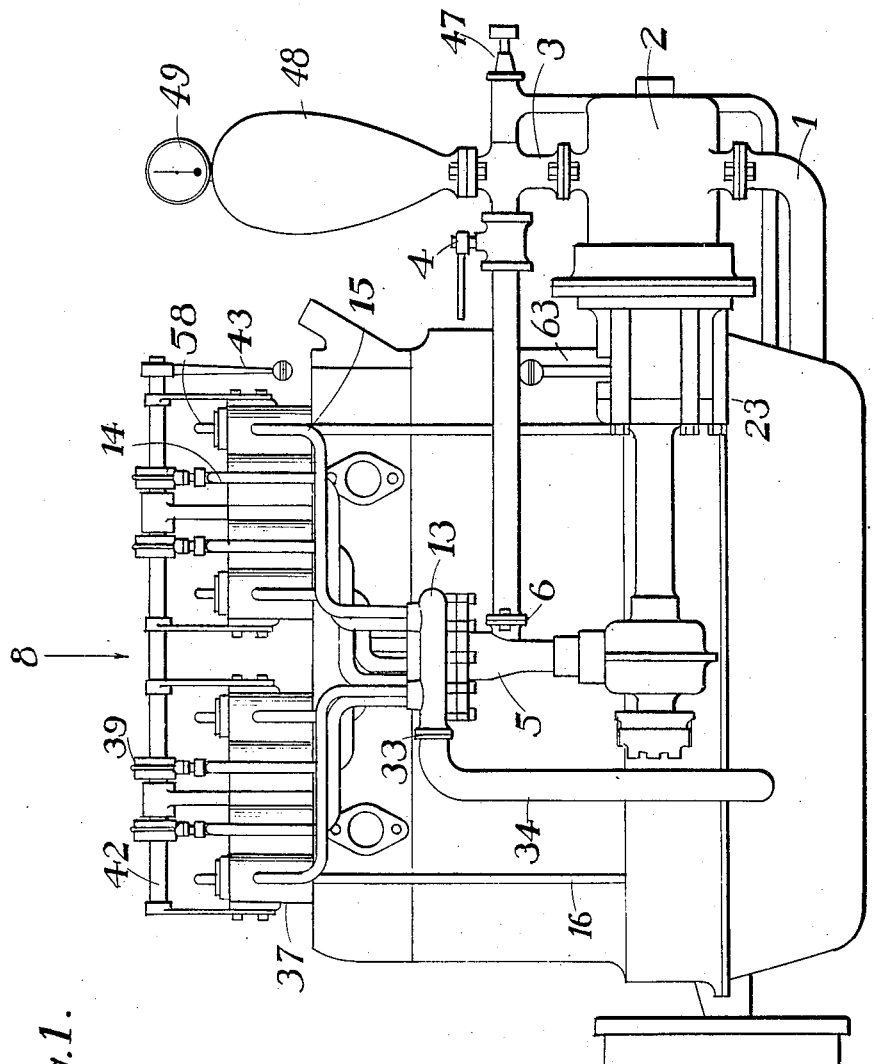

In the form of my invention as used for actuating the intake and exhaust poppet valves for an internal combustion engine for the power drive I use oil as the hydraulic fluid which may be carried in the crankcase of the engine. The general features of the oil circulation and distribution are as follows:

An intake tube 1 (note particularly Figs. 1 and 12) supplies the hydraulic fluid to a pump 2, such pump being common to both features of my invention and driven in any suitable manner by the engine. For instance, it may be driven by the crank shaft through chain and sprockets. The oil is transmitted from the crank case through a distribution system to a series of small cylinders each of which operates a conventional poppet valve, the hydraulic operation being to open the valves, and the valves being closed by their springs. The oil returns to the crank case and thus completes the circuit. The oil travels from the pump through tubing 3 to a two-way valve 4, and for the power actuation of the engine flows through an oil distributor base 5 (note Fig. 1 and details in Fig. 2). This has a fluid intake 6, the oil passing upwardly through an opening 7 and into the hollow rotor of the distributor, this being illustrated in details in Figs. 2, 5, 6 and 7.

The rotor has ports 9 and 10, of which the port 9 is indicated as supplying the fluid for operating the intake poppet valve and the port 10 for actuating the exhaust poppet valve. These ports in the rotor are thus brought into and out of registry with stationary ports 11 and 12 in the stationary head of the distributor. In the present instance the port 11 leads to the cylinder actuating the intake poppet valve and the port 12 to the exhaust poppet valve. These stationary ports and the tubing connections are in the oil distributor head 13, from which the oil tubing 14 and 15 leads to cylinders in which are located the pistons 17 and 18. (Note particularly Fig. 11.) A drainage tube 16 conveys leakage oil to the crank case. These pistons are located in the valve operating cylinders 29 and 30 in which the cylinder 29 is operative with the intake poppet valve and the cylinder 30 with the exhaust poppet valve.

The rotor 8 of the distributor is driven at onehalf of the crank shaft speed, the specific drive illustrated being through the medium of a spline shaft 19, (note Figs. 2 and 9), such shaft being illustrated as driven through the medium of the mitre gears 20 and 21, the latter gear being mounted on a horizontal drive shaft 22 driven through the medium of a differential mechanism 23. This differential is for the purpose of varying the timing of the hydraulic distributor and hence the poppet valves to regulate the relative timing of the opening and closing of the intake and exhaust poppet valves. This differential may be actuated through the medium of a sprocket 24 (note Fig. 2), actuated by the engine in any suitable manner.

The details of the rotor 8 of the distributor are substantially as follows, and being presented mainly in Figs. 2, 5, 6 and 7. It consists of a single hollow casting containing elevated flat surfaces 25 and 26 in which are located the ports 9 and 10. These surfaces bear on the underside of the distributor head having the fixed ports 11 and 12, through the medium of which the oil passes to the operating cylinders 29 and 30. The low portion 31 of the rotor when passing the fixed ports 11 and 12 allows discharge from such ports, this discharge being on the closing action of the poppet valves through the action of the springs of such valves.

One of the features of improvement of my invention in the hydraulic type of popet valve manipulation is in releasing the back pressure on the pistons which operate the poppet valves. To obtain this result I develop centrifugal action of the exhaust fluid and for this purpose form a surrounding passage or space 32 (note Fig. 2) in the upper portion of the distributor head 13. This leads to the outlet 33, the action being that the rotor of the distributor operates somewhat as a centrifugal pump into which the spent oil passing through the ports 11 and 12 is rapidly exhausted from the cylinders operating the poppet valves. A partial vacuum is generated within the distributor head 13, which reduces the resistance to be overcome by the valve springs in returning the hydraulic pistons to their initial positions and thus increases the rapidity of closing of the poppet valves. The exhaust oil from the outlet 33 returns to the crank case through a tube 34 and thus completes its cycle of flow.

In order to obtain a proper seal of the rotor of the distributor against the seat carrying the ports 11 and 12 this rotor is free to slide vertically on the spline shaft 19 (note Figs. 2 and 9) and is held in contact with the fixed distributor head having the ports 11 and 12 by the constant pressure upward of the oil supply through the oil distributor base 5. The clearance between the rotor and the cylindrical bearing surface in which it operates is sealed by rings 35, which rings are a type which do not rotate with the rotor. The rings thus prevent any up flow of pressure oil on the outside of the rotor.

The specific setting of the respective moving and stationary ports is as follows:

The ports 9 and 10 in the rotor 8 are located at different radial distances from its axis of rotation; also the complementary ports 11 and 12 in the fixed portion of the distributor head are spaced at different distances from the axis of the rotor. Thus the ports 9 and 10 operate in two circles of different diameters which do not overlap, and thus a specific sequence of operations is secured in their registry with the fixed ports 11 and 12, therefore regulating the oil supply to the poppet valves operating cylinders 29 and 30 in conformity with a conventional firing order of an internal combustion engine. As above mentioned, the complementary ports 9 and 11 control the intake poppet valve and the complementary ports 10 and 12 control the exhaust poppet valve.

The opening of a poppet valve begins to occur for instance when one of the ports 9 or 10 in the rotor begins to coincide with its corresponding fixed port 11 or 12 located in the oil distributor head 13. Also the closing of a poppet valve begins when the trailing edges of the upper flat surfaces 25 and 26 of the rotor commence to pass the corresponding ports 11 and 12.

The intake poppet valve is actuated through the medium of the cylinder 29 in which is fitted the piston 17 above designated, which piston is free to reciprocate within the limits, being confined at its upper end by the cylinder head 36 and at the bottom by a fixed stop of any suitable character. The cylinders in which the pistons operate for controlling the poppet valves are located in a housing cage 37, this being shown as mounted on the head of the internal combustion engine. In the present instance my invention is shown installed on a so-called "valve-in-head" type of engine.

The manner of adjusting and equalizing the amount of opening of the several intake poppet valves is by the following mechanism. An eccentric 38 (note Fig. 11) operates an eccentric ring 39 to which is connected an adjusting screw 40 with locknut, one end of the screw having a ball and socket connection 41 to the cylinder head 36. The series of eccentrics are mounted on the eccentric shaft 42, which may be mounted in any suitable manner connected for instance to the housing or cage 37. This eccentric shaft may be rocked,—that is, partly rotated through the medium of the valve opening adjusting lever 43 (note Figs. 11, 1 and 12). The operation of this lever and hence the rocking of the eccentric shaft may be used as a type of throttle control of the engine by varying the amount of the intake poppet valve opening, and an important feature of my invention is that this action may be carried on while the engine is running.

The control of the cylinder 30 for operating the exhaust poppet valve is as follows: This cylinder is fitted with a piston 18 and also with a piston 44 (note Fig. 11), and the particular function of the piston 44 will be detailed hereunder. Oil from the distributing head exhaust port 12 is transmitted through the tubes 15 and admitted to the exhaust valve operating cylinder 30, there being an opening 45 in the cage 37 to accommodate such tube. The exhaust valve operating cylinder 30 is adjustable in the cage 37 and when adjusted is secured by locking set screw 46 extending through the walls of the cage 37.

Figure 12:
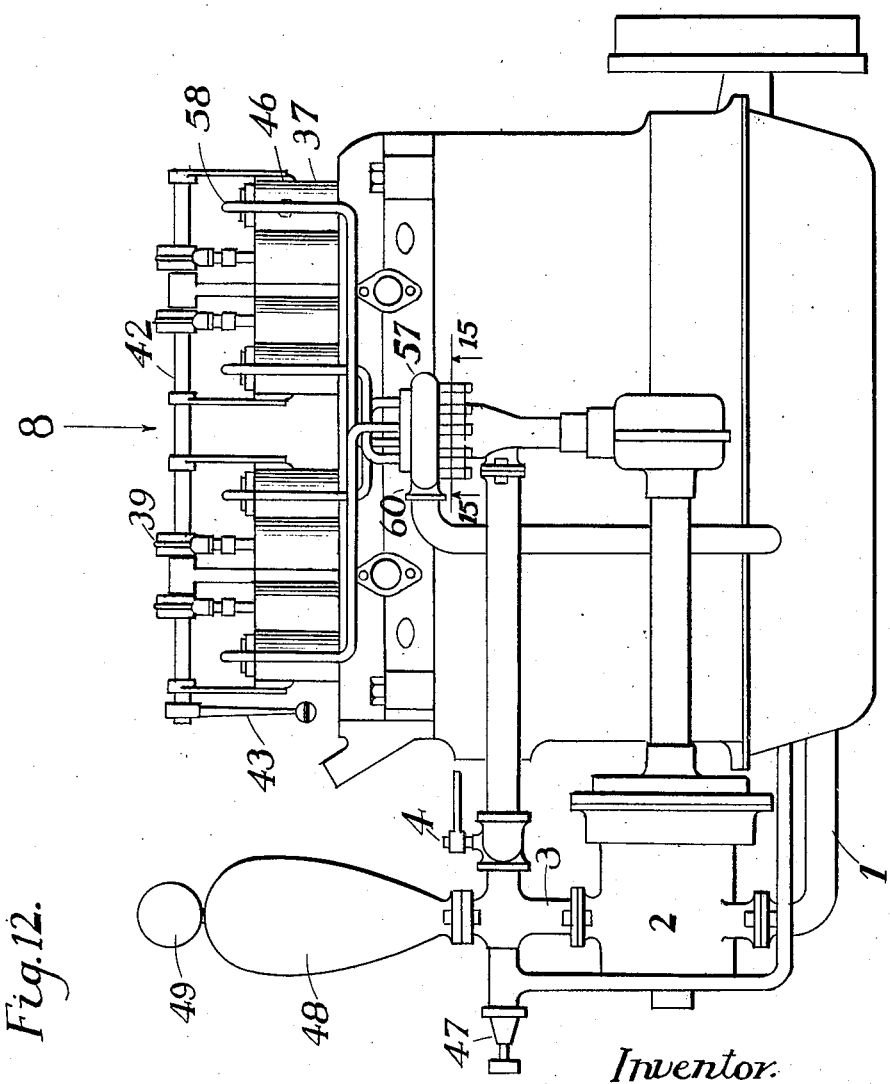
Fig. 12 is an elevation of the opposite side of the engine from that of Fig. 1 and may be considered as taken in the direction of the arrow 12 of Fig. 8. Such figure illustrates mainly the hydraulic distributor and hydraulic connections for operating the exhaust valves on the two cycle principle for using the engine as a pump in braking operations.

With a hydraulic manipulation of the poppet valves I provide the pump 2 with a pumping capacity slightly in excess of the maximum amount of oil required to operate the poppet valve actuating cylinders 29 and 30, and the excess oil is allowed to escape into the crank case by means of a pressure relief valve 47 (note Figs. 1 and 12). An air chamber 48 furnishes a cushion for the hydraulic cylinder and the pressure may be determined by the pressure gauge 49.

The construction and manner of advancing and retarding the timing of the opening and closing of the poppet valves is as follows, and is accomplished through the medium of the differential mechanism designated by the assembly numeral 23. (Note particularly Figs. 2 and 10.) This differential has a housing containing a ring 62 through which extends diametrically combined hand lever and shaft 63 which shaft forms a bearing for spider gears 64 and 65. The shaft extends outwardly through a slot in the housing, the exposed part forming an operating lever which may be manually or otherwise operated. A mitre gear 66 is keyed or otherwise secured to a driving shaft 68 driven from the engine and having the sprocket wheel 24 thereon. The complementary mitre gear 67 is keyed to shaft 22 and thus through the differential a drive is communicated to the spline shaft 19. By this construction a movement of the lever 63 in an arc results in advancing or retarding the relationship between the rotor of the distributor and the crank shaft of the engine, and hence an advancing or retarding may be obtained of the opening and closing of the hydraulic and hence of the poppet valves.

It will be understood that the internal combustion engine may have the usual type of throttle control for the fuel and an electrical distribution system for the spark plug ignition, and that the throttle control may be used to vary the amount of fuel and the timing of the spark may be advanced or retarded as desired to thus vary the time of firing. However, independent of such usual control of the engines, in my construction I may vary the degree or amount of the opening of both the intake and exhaust poppet valves. I may further, while the engine is operating, vary the amount of opening of the intake poppet valve and thus in effect control the amount of fuel to the engine. In addition, by operating the differential I may vary the timing of the opening and closing of the intake and exhaust poppet valves in relation to the position of the pistons in the engine cylinders and thus control the amount of escape of the ignited fuel as well as the amount of intake fuel in the engine.

The second type of my invention, to develop a restraining torque when the load in effect drives the engine and thus cause a braking action, is substantially as follows: Having reference particularly to Figs. 8, 11, 12 and 13 through 17, in this procedure the valve 4 is turned to direct the hydraulic fluid from the distributor 13 (note Figs. 8 and 12). The hydraulic fluid flows through a second distributor rotor 50 which may be driven by a splined shaft similar to the splined shaft 19 above described, and driven in any suitable manner at one-half of the crank shaft speed. This rotor (note particularly Figs. 13 through 17) has two elevated flat surfaces 51 and 52, containing ports 54 and 53, these ports being at the same radial distance from the axis of rotation. The rotor is pressed upwardly against the distributor head 57 so that the ports 53 and 54 register with the stationary ports 55 and 56 in this distributor head. The oil is carried by pipes to the connection 58 of the exhaust cylinders 30. The rotor distributor has a low section 59 for discharge of fluid flowing back through the ports 55 and 56. There is an outlet 60 from the distributor head which connects to the crank case and thus provides for the return of the oil. In order to prevent leakage past the rotor stationary rings 61 are utilized, having the same function as the rings 35 illustrated and described in connection with Figs. 2 and 6.

The manner of action and functioning of the hydraulic control of the exhaust poppet valve is as follows: For instance, when the load is driving the engine as when a vehicle is coasting down hill and it is desired to provide a restraining torque the hydraulic valve timing is readily changed from the four stroke cycle used in connection with the ignition to a two stroke cycle. The poppet intake valve is maintained closed and then on the compression stroke of the engine piston the exhaust poppet valve is opened at or near its top dead center, permitting air to be drawn into the cylinder from the exhaust manifold. In this action the oil flows into the exhaust cylinder 30 above the secondary piston 44, hence such piston acts on the lower piston 18 and thus on the exhaust poppet valve, opening this. This air is drawn in from the exhaust manifold and may continue until the piston is at or near the bottom dead center at which time the exhaust hydraulic valve is closed and waste opened, thus allowing the spring of the exhaust poppet valve to close such valve. On the return stroke of the engine piston air is compressed in the engine cylinder and hence placing a restraining force upon the rotating crank shaft and hence retarding the vehicle or developing a braking action on any mechanism connected to the crank shaft. When the piston returns to near its top dead center the exhaust hydraulic valve is again actuated to open the exhaust poppet valve and thus allow exhausting of the compressed air to the exhaust manifold. This completes the cycle of operations.

It will be noted that on account of the intake poppet valves being closed during this two cycle operation of the exhaust poppet valves no fuel is being drawn into the engine, the engine thus acting as a pump, and this not only retards a vehicle if the engine is mounted for driving such vehicle, but also the pumping of the air functions to cool the engine. Thus on long down grades for heavy loads the engine may thus effectively function as a brake and thus lessen the wear on the brakes of the wheel of the vehicle.

The proportions of the flat surfaces 25 and 26 of the rotary distributors of Figs. 5, 6 and 7, and also the relative proportions of the flat surfaces 51 and 52 of the distributor of Figs. 13, 14 and 16 in reference to its ports should be such that the flat portion on each side of the port of the rotor is of sufficient area to cover the stationary port of the distributor, this being so that the hydraulic fluid under pressure operating through the ports in the rotor will not have a back flow into the depressed portions of the rotor and thus having an immediate outlet. Also the flat surface on the trailing side of the ports of the rotor should be of sufficient extent to confine the hydraulic fluid within the tubes and hydraulic cylinders for the required time which the valves are to remain open. Manifestly as soon as the flat portion following the port on the distributor passes one of the stationary ports the exhaust occurs from the hydraulic cylinders operating the poppet valves. Due to the construction of the rotors they develop a centrifugal pumping action causing a partial vacuum in the hydraulic cylinders and thus giving a quick exhaust.

By the construction and operation above detailed of the hydraulic control of the poppet valves for the power drive and also for the hydraulic control of the exhaust valve to cause the engine to act as a brake by pumping, it will be apparent that the main hydraulic pump 2 does not require to be changed as to its speed of operation for when the engine operates on the two-cycle principle on account of the exhaust port being opened twice as often the same amount of hydraulic fluid is utilized. It will be understood that suitable connections may be made to the driving compartment of a vehicle so that the operator may readily control the two-way valve 4 and may also control and actuate the lever 63 of the differential mechanism 23 and valve control 43. Also it is not necessary to cut out the ignition when the engine is used as a brake because there would not be an explosive gas in the cylinders and hence the spark ignition will be inoperative.

My invention as to the hydraulic control of poppet valves is applicable to the Diesel and semi-Diesel types of engines in which both the intake poppet valves for air and the exhaust poppet valves may be actuated hydraulically, also in such construction a similar mechanism with hydraulic operation may be used to operate the exhaust valves when it is desired to use the engine as a pump for purposes of braking or retarding the engine. In this arrangement the intake valves may, if desired, also be a small type of poppet valve.

An advantage of using my construction in these types of engines is that a change of timing of the fuel intake valve may be obtained and thus a regulation made of the time of firing or explosion in the cylinders.

From the above description it will be seen that I can make an accurate adjustment of the intake cylinders 29 by means of the adjusting screw 40, this being done while the engine is stationary, and thus adjusts the lift of the intake poppet valves. However, as above mentioned, this lift may be changed while the engine is operating due to the action of the rock shaft 42 raising or lowering the cylinders 29. Of course in this action the hydraulic pipes or tubing leading to the cylinder must be slightly flexed, and as above noted the exhaust cylinder 30 may be accurately adjusted and secured by the set screw 46, this being while the engine is stationary.

Although I have shown my invention in connection with a four cylinder engine it will be apparent that it may be used in engines of a lesser or greater number of cylinders. In some cases, particularly in large engines, where a high degree of efficiency is important, it may be of advantage to have a separate distributor each with its rotor and set of valves for both the intake and exhaust control cylinders for the intake and exhaust poppet valves, this being for the power drive of the engine; then by varying the timing of the intake and exhaust poppet valves one separate from the other they may be adjusted to the best efficiency for the engine.

Various changes may be made in the details of construction without departing from the spirit or scope of the invention as defined by the appended claims.

I claim:

1. In an internal combustion engine having one or more cylinders, each with an intake and an exhaust poppet valve, a hydraulic cylinder having a piston and hydraulic means to operate said piston, the piston having an operative connection with the intake poppet valve to open said valve, and means to bodily move said cylinder to vary the amount of opening of the intake poppet valve.

2. In an internal combustion engine as claimed in claim 1, a hydraulic distributor for controlling the hydraulic fluid to the hydraulic cylinder having the piston, the said distributor having ports for the flow of pressure and exhaust fluid and means to change the relative position of said ports to vary the timing of the opening of the poppet valves in reference to the pistons of the engine.

3. In an internal combustion engine having a cylinder with an intake and an exhaust poppet valve, a pair of hydraulic cylinders each with a piston, each piston having an operative connection to one of the poppet valves, hydraulic means to operate each piston, and means to vary the stroke of the piston of the intake valve operative while the engine is in motion to increase or decrease the lift of the intake poppet valve, the hydraulic cylinders having a housing frame and the exhaust valve cylinder having a slidable mounting in said housing frame, with means to secure said cylinder in a fixed position.

4. In an internal combustion engine having an operating cylinder with an intake and an exhaust poppet valve, a pair of hydraulic cylinders each having a piston operatively connected to a poppet valve, a frame housing having a guide for the intake cylinder, a rock shaft, a connection from the rock shaft to the intake cylinder to move said cylinder longitudinally in the frame, and a distributing system for a hydraulic fluid to actuate each of the pistons in its cylinder.

5. In an internal combustion engine as claimed in claim 4, the hydraulic system having a hydraulic distributor with a series of fixed ports and a rotor having rotating ports and a discharge space, a shaft for driving the rotor, a mechanical drive from the said shaft to the engine and means to advance or retard the said shaft of the distributor in reference to the drive from the engine, the fixed ports being adapted to transmit fluid to the hydraulic cylinders, the same ports returning the fluid to the said discharge space.

6. In an internal combustion engine having a power cylinder with an intake and an exhaust poppet valve, a hydraulic cylinder for each valve, each hydraulic cylinder having a piston for operating the poppet valves, and supply means for hydraulic fluid, a first distributing means for the fluid to supply the fluid for operating the pistons of the intake and exhaust valves, a diverting means for the fluid, a second piston in the exhaust hydraulic cylinder, a second distributor, said second distributor supplying the fluid to operate said second piston, the said second piston being positioned to actuate the first piston in the exhaust hydraulic cylinder for operating the exhaust poppet valve to develop a flow of air in and out of the engine cylinder.

7. In an internal combustion engine as claimed in claim 6, each of the distributors having a rotor with ports coacting with complementary fixed ports, a means to drive each rotor from the engine, a means to advance or retard the drive of the rotor controlling the hydraulic fluid to said intake and exhaust hydraulic cylinders.

8. In an internal combustion engine having a cylinder with intake and exhaust poppet valves, a hydraulic cylinder, each with a piston for operating each poppet valve, a hydraulic system for actuating each of the said pistons to operate its poppet valve, means for diverting the flow of hydraulic fluid from the intake hydraulic cylinder to operate the piston of the exhaust hydraulic cylinder whereby the intake poppet valve remains closed and the exhaust poppet valve is operated for intake and exhaust of air.

9. In an internal combustion engine having an engine cylinder with intake and exhaust poppet valves, a first hydraulic system for operating the said poppet valves for a power drive of the engine, a second hydraulic system having means for discontinuing the hydraulic operation of the intake poppet valve to maintain said valve closed, said second hydraulic system having means for actuating the exhaust poppet valve to cause said valve to operate as an intake and an exhaust for air in relation to the engine cylinder.

10. In an internal combustion engine as claimed in claim 9, the exhaust poppet valve having associated therewith a cylinder with a first and a second piston, the first piston being mounted to directly actuate the exhaust poppet valve when actuated by the first hydraulic system, the second piston being positioned to act on the first piston when actuated by the second hydraulic system.

11. In an internal combustion engine having a cylinder, an intake and an exhaust poppet valve, two hydraulic cylinders, each having a piston, one piston having an operative connection to the intake and the other piston a connection to the exhaust poppet valve, a distributor having a fixed port with a connection to the cylinder of the intake and a second fixed port with a connection to the cylinder of the exhaust valves, a rotor for the distributor, means to force fluid through the distributor under pressure and means to rotate the rotor whereby the fluid under pressure and the waste fluid to the intake cylinder flows through the same fixed port and also the fluid under pressure and waste fluid to the exhaust cylinder flows through the other fixed port, the rotor having means to create a suction for the waste fluid whereby the poppet valves may operate with a rapid closure.

12. In an internal combustion engine, the combination of one or more engine cylinders, each cylinder having a piston and each cylinder also being provided with an intake poppet valve and a hydraulic cylinder with a hydraulically actuated piston with connections to operate the intake poppet valve, an exhaust poppet valve and a hydraulic cylinder with a hydraulically actuated piston and connections therefrom to actuate the exhaust poppet valve, a hydraulic distributor having a housing with a first set of fixed ports and a connection from each port to a hydraulic cylinder for operating an intake poppet valve and a second set of fixed ports with a connection therefrom to a hydraulic cylinder for operating an exhaust poppet valve, a rotor for the distributor having a plurality of moving ports and a space for waste fluid to co-act with the two series of fixed ports of the distributor housing, means to force a hydraulic fluid through the distributor under pressure, means to rotate the rotor of the distributor, the said rotor having means to develop a centrifugal exhaust from both of the sets of fixed ports of the distributor housing to the said space in the rotor whereby on operation of the rotor of the distributor, pressure and waste fluid to both sets of hydraulic cylinders flows respectively through the two sets of fixed ports for operating the pistons of the hydraulic cylinders and therefore the poppet valves of the engine.

13. In an internal combustion engine as described in claim 12, the distributor housing having a substantially flat head with the sets of fixed ports therein, the rotor having elevated flat ends with the moving ports therein, said ends engaging the flat head, the rotor having a depressed portion forming a space between said portion and the flat head, means on the rotor connected with the depressed portion to develop a centrifugal force in the fluid whereby the waste fluid is quickly withdrawn from the two sets of fixed ports to facilitate rapid closing of the poppet valves.

14. In an internal combustion engine as described in claim 12, means to simultaneously move all of the hydraulic cylinders for the intake valves to vary the stroke of the pistons therein relative to the intake poppet valves and thereby change the degree of opening of such poppet valves.

15. A hydraulic distributor having a housing with a substantially flat head and a plurality of fixed ports with conduits connected thereto, the housing having a marginal space for quick discharge of waste fluids, a rotor having a fluid passage longitudinally thereof, said rotor having elevated surfaces engaging the flat head, each surface having a port therein of less size than the said surface to register with the fixed ports, the rotor having a depressed structure forming a space adjacent the flat head, the said space registering with the fixed ports, the rotor having means to develop an outward centrifugal flow of fluid in the said space, means to force fluid longitudinally through the rotor to develop a seal between the elevated surfaces of the rotor and the flat head, means to rotate the rotor whereby the fluid under pressure and waste fluid passes respectively through the fixed ports of the head from the rotating ports of the rotor to the said space in the rotor and is thereby quickly exhausted to the marginal exhaust space in the housing.

16. In an internal combustion engine having a cylinder with its piston, an intake valve and an exhaust valve, means to actuate the intake valve, a separate means to actuate the exhaust valve, means to discontinue the operation of the intake valve, means to retain said intake valve closed and means to operate the exhaust valve whereby such latter valve causes the engine cylinder with its piston to operate to develop a braking action.

17. In an internal combustion engine having an engine cylinder with its piston, intake and exhaust poppet valves with means to normally close said valves, a first means to actuate the intake and the exhaust poppet valves on a 4-cycle principle, means to at will discontinue such operation of the poppet valves, the intake valve being retained closed and a second means to actuate the exhaust poppet valve on the 2-cycle principle whereby the engine cylinder with its piston operates as a brake in connection with the exhaust of the engine cylinder.

18. In an internal combustion engine having an engine cylinder with its piston, an intake valve, an exhaust valve, means to actuate the intake valve on a 4-cycle principle, a first hydraulic means to operate the exhaust valve on a 4-cycle principle, means to at will discontinue the operation of the intake valve, whereby such valve remains closed, means to at will discontinue the operation of the exhaust valve on the 4-cycle principle, a second hydraulic means operatively connected to the exhaust valve to operate such valve on the 2-cycle principle whereby the engine cylinder with its piston operates as a brake.

19. In an internal combustion engine having an engine cylinder with its piston, intake and exhaust poppet valves combined with a first hydraulic means to operate both of said valves on 4-cycle principles, means to discontinue the operation of said valves on the 4-cycle principle whereby the intake poppet valve remains closed, a second hydraulic means having a connection to operate the exhaust poppet valve on the 2-cycle principle whereby the engine cylinder with its piston operates as a brake.

20. In an internal combustion engine, having a cylinder and its piston, with an exhaust poppet valve combined with a hydraulic cylinder having a first piston with a connection for operating said poppet valve, a first hydraulic distributor having means to actuate the first piston for operating the said poppet valve, the hydraulic cylinder having a second piston, a second hydraulic distributor having means to operate the second piston, the second piston having means to actuate the first piston, means to disconnect the operation of the first distributor and means to operate the second distributor to actuate the poppet valve at twice the frequency of the first distributor.

21. In an internal combustion engine having a cylinder with an intake and an exhaust poppet valve, a pair of hydraulic cylinders each with a piston, each piston having an operative connection to one of the poppet valves, hydraulic means to operate each piston and manually operative means to vary the stroke of the piston of the intake valve only variable amounts, operative while the engine is in motion to increase or decrease the lift of the intake poppet valve.

22. In an internal combustion engine, an engine cylinder having an intake and an exhaust poppet valve, a pair of hydraulic cylinders each with its piston, each piston being operatively connected to a poppet valve, a hydraulic connection to each of the hydraulic cylinders having a pressure and an exhaust connection including a hydraulic distributor having a series of fixed ports with connections from said ports to the hydraulic cylinders, a rotor having moving ports to register with the fixed ports and supply pressure fluid, said rotor having means for discharge of hydraulic fluid from the fixed ports, the said rotor having a central open space with radial walls, the open space forming a connection to the fixed ports for the exhaust fluid, said rotor being adapted to develop a centrifugal suction action on the exhaust fluid whereby the fluid is rapidly withdrawn through the same fixed port from which it flows to a hydraulic cylinder.

23. In an internal combustion engine, an engine cylinder having an intake and an exhaust poppet valve, a pair of hydraulic cylinders each with its piston, each piston being operatively connected to a poppet valve, a hydraulic connection to each of the hydraulic cylinders having a pressure and an exhaust connection including a hydraulic distributor having a series of fixed ports with connections from said ports to the hydraulic cylinders, a rotor having moving ports to register with the fixed ports and supply pressure fluid, said rotor having means for discharge of hydraulic fluid from the fixed ports, a hydraulic fluid supply having a diverting valve, a second hydraulic distributor having a rotor with ports co-acting with the stationary structure having complementary ports, a fluid connection from the stationary ports to the hydraulic cylinder for operating an exhaust poppet valve whereby on diversion of the hydraulic fluid the hydraulic cylinder controlling the intake poppet valve becomes inoperative and the hydraulic cylinder for operating the exhaust poppet valve becomes operative to develop a flow of air in and out of the engine cylinder.

24. In an internal combustion engine, the combination of an engine block with a plurality of cylinders, poppet intake and exhaust valves for each cylinder, hydraulic cylinders each having a piston, one piston operating an intake and another an exhaust poppet valve for each engine cylinder, a hydraulic pump driven by the engine, a fluid reservoir in the base of the engine, a hydraulic distributor having a rotor with ports coacting with stationary ports, a hydraulic connection from the pump to the distributor and from the fixed ports of the distributor to the intake hydraulic cylinders, a waste fluid connection from the distributor to the base of the engine, the exhaust hydraulic cylinder having a second piston positioned to operate on the first piston in such cylinder, a second distributor having a rotor driven by the engine, the said rotor having ports cooperating with fixed ports, a hydraulic connection from the pump with means for diverting the fluid from the first to the second distributor and a hydraulic connection from the fixed ports of the second distributor to the exhaust hydraulic cylinder and a waste connection from the second distributor to the base of the engine.

25. In an internal combustion engine, the combination of an engine block with a plurality of cylinders, poppet intake and exhaust valves for each cylinder, hydraulic cylinders each having a piston, one piston operating an intake and another an exhaust poppet valve for each engine cylinder, a hydraulic pump driven by the engine, a fluid reservoir in the base of the engine, a hydraulic distributor having a rotor with ports coacting with stationary ports, a hydraulic connection from the pump to the distributor and from the fixed ports of the distributor to the intake hydraulic cylinders, a waste fluid connection from the distributor to the base of the engine, means to raise and lower the intake hydraulic cylinders to thereby alter the lift of the poppet valves and means to advance or retard the rotor of the hydraulic distributor to vary the timing of the operation of the hydraulic cylinders and pistons in relation to the driving means from the engine to the distributor.

26. In an internal combustion engine, the combination of an engine block with a plurality of engine cylinders, a hydraulic intake cylinder operatively connected to an intake poppet valve for each engine cylinder, a hydraulic exhaust cylinder operatively connected to an exhaust poppet valve for each engine cylinder, a hydraulic pump driven by the engine, a fluid reservoir connected to the pump, a hydraulic distributor having a housing connected to the engine and with a port with a connection to each of the hydraulic cylinders, a rotor for the distributor driven by the engine and having a series of ports to register with each of the fixed ports for the supply of power fluid under pressure to the intake and exhaust hydraulic cylinders, the rotor having means to discharge waste fluid from the fixed ports from each of the intake and exhaust hydraulic cylinders and means in the distributor to create a suction for the discharge waste fluid.

27. In an internal combustion engine having an engine cylinder with an engine piston and with an exhaust poppet valve combined with a hydraulic cylinder having a piston and a connection for operating the poppet valve by the said latter piston, a hydraulic distributor with a connection to the hydraulic cylinder with means to operate said distributor to open the exhaust poppet valve on the suction stroke of the engine piston and to close the poppet valve during the compression stroke of the engine piston whereby the engine piston with its poppet valve acts as a brake.

28. In an internal combustion engine having an engine cylinder with its engine piston and an exhaust poppet valve combined with a hydraulic cylinder having a first piston with a connection for operating said poppet valve, a second piston in the hydraulic cylinder operatively engaging the first piston, a hydraulic distributor having means to operate the second piston, the second piston thereby operating the first piston and the poppet valve at such a rate that gas is drawn in at the exhaust poppet valve to the engine cylinder during a suction stroke and compressed on a reverse stroke to cause the engine cylinder with its piston to operate as a brake.

29. In an internal combustion engine as claimed in claim 28, the engine having an intake poppet valve, a second hydraulic distributor, means to render the first hydraulic distributor inoperative, means to at will operate the second distributor, the second distributor having means to operate the first piston in the hydraulic cylinder and retain the second piston inoperative and means to actuate the intake valve whereby the engine operates for power development.

30. In an internal combustion engine as claimed in claim 28, the engine having an intake poppet valve, a second hydraulic cylinder having its piston, such piston operatively engaging the intake poppet valve to actuate the same, a second hydraulic distributor having a hydraulic connection to the first cylinder to operate the first piston for actuating the exhaust poppet valve and a connection to the second hydraulic cylinder for actuating the intake poppet valve, means to at will discontinue the operation of the first distributor and initiate the operation of the second distributor whereby the engine operates on a four cycle principle as a power unit.

31. In an internal combustion engine having an engine cylinder and an engine piston, intake and exhaust poppet valves and a hydraulic cylinder with means for operating each poppet valve from its own hydraulic cylinder combined with means to at will discontinue the hydraulic operation of both poppet valves and retain the intake poppet valve closed, the hydraulic cylinder operating the exhaust poppet valve having a hydraulic means to actuate the exhaust poppet valve on a two cycle principle whereby the engine cylinder with its engine piston operates as a brake.

32. In an internal combustion engine, an engine cylinder, an intake poppet valve, an intake actuating hydraulic cylinder with a piston operatively connected to the intake poppet valve, an exhaust poppet valve, an exhaust actuating hydraulic cylinder with a second piston therein, and a connection between the latter piston and the exhaust poppet valve, a distributor having a housing with a first fixed port and a hydraulic connection from such port to the intake actuating hydraulic cylinder, a second fixed port and a hydraulic connection therefrom to the exhaust actuating hydraulic cylinder, a rotor in the hydraulic distributor with means to rotate the same, said rotor having moving ports to register with the two fixed ports and having a common space to also register with the two fixed ports, means to force hydraulic fluid through the ports of the rotor under pressure whereby hydraulic fluid is forced through the ports of the distributor, the fixed ports of the housing to both the intake actuating and the exhaust actuating hydraulic cylinders, the distributor housing having means to discharge waste fluid from the said space of the rotor whereby the waste fluid from both of the hydraulic cylinders is returned through the first and the second fixed ports after the power stroke of each of the hydraulic cylinders.

LESTER CHARLES SMALL.